Figure 1:
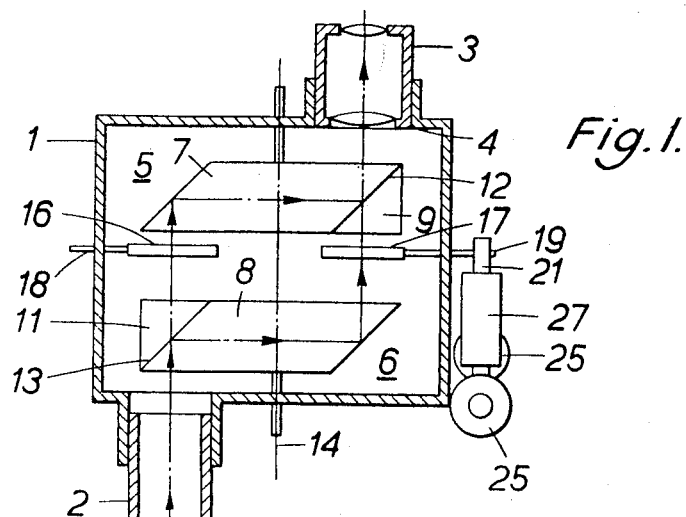

June 20, 1967  J. DYSON ET AL  3,326,079
OPTICAL APPARATUS FOR CHECKING THE DISTANCE
BETWEEN TWO POINTS ON AN OBJECT AND METHOD
FOR MEASURING SMALL DISTANCES
Original Filed May 25, 1962

3,326,079
OPTICAL APPARATUS FOR CHECKING THE DISTANCE BETWEEN TWO POINTS ON AN OBJECT AND METHOD FOR MEASURING SMALL DISTANCES
James Dyson, Tilehurst, Reading, and Peter John Wellesley Noble, Reading, England, assignors to Associated Electrical Industries Limited, London, England, a British company
Continuation of application Ser. No. 197,780, May 25, 1962. This application May 6, 1966, Ser. No. 548,018
Claims priority, application Great Britain, May 30, 1961, 19,500/61
7 Claims. (Cl. 88—14)

The present invention relates to optical apparatus and in particular to optical apparatus for checking the distance between two points on an object. The present invention also relates to a method for checking the distance between points on an object.

The present application is a continuation of our previous application Ser. No. 197,780, filed May 25, 1962.

It is known to measure small distances between points on an object by forming two images of the object and moving these two images relative to each other until one image of one point coincides with the other image of the other point. The two images will then have been moved through a distance equal to the distance between the two points. If the two points are located at diametrically opposite positions on the object the distance will represent the width of the object. Hence such a method can be used to measure the width of the diameter of an object, for example.

It may be desirable to determine whether the distance between points on a plurality of objects or the diameters of a plurality of objects lie between certain limits. This problem would arise for example in the comparison of a plurality of nearly identical objects, as during inspection in a factory or in the counting of a plurality of particles, for example dust particles, lying between fixed limits of size. Apparatus is therefore required in the form of a "Go or No Go" gauge for checking distances between points on an object or the width of the object. These distances or widths are small.

The object of the present invention is to provide optical apparatus for checking small distances between two points on an object.

Another object of the present invention is to provide a method for checking small distances between two points on an object.

According to the present invention optical apparatus for checking the distance between two points on an object comprises two optical systems, means for passing a beam of light from said object through each of said optical systems so as to form two images of said object, means for moving primary components of said optical systems relative to each other predetermined amounts from reference positions in which said images coincide, and means for oscillating a secondary component of one of said optical systems between two selected positions and thereby oscillating said images relative to each other between two selected positions.

In order to check the distance between two points on the object, the primary components are first moved relatively a predetermined amount so as to move the images of the two points towards each other, and then the secondary component is oscillated between the selected positions. This oscillation will cause the images to oscillate between two selected positions. If the images of the points coincide when the images are in either of these two selected positions or at some instant when the images are moving between the two selected positions, the distance between the two points lies between selected limits.

The apparatus can therefore be used to check whether the distances between corresponding points on a plurality of objects lie between certain limits.

The secondary component can be oscillated between adjustable stops so as to vary the selected positions and the limits described above. The oscillation can be performed manually or automatically.

Figure 2:
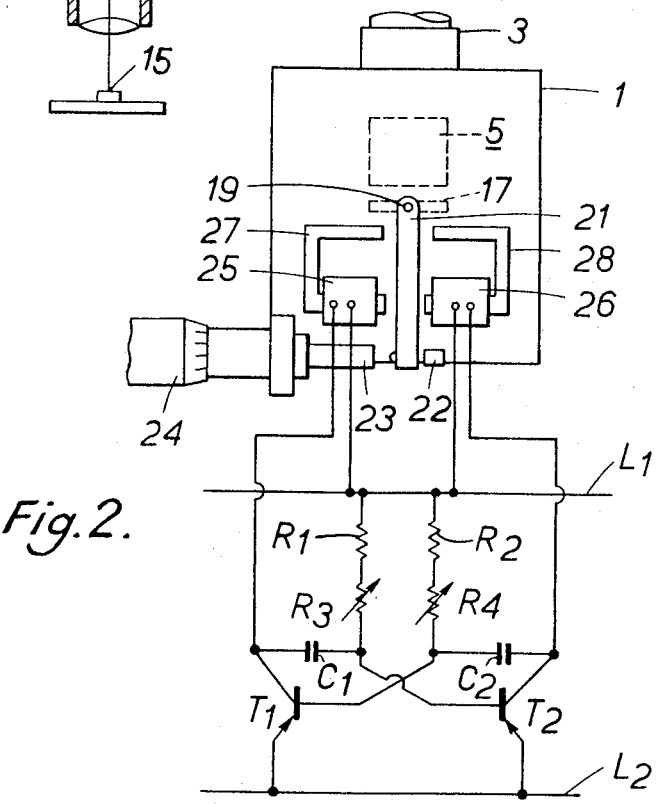

In order that the invention may be more readily understood reference will now be made to the accompanying drawing in which:

FIG. 1 is a side view partly in section of optical apparatus embodying the invention; and FIG. 2 is an end view of the apparatus including a diagram of an associated electrical circuit.

With reference to the two figures the optical apparatus comprises a container 1, which is adapted to fit over the top of a microscope draw tube 2, and includes an eye piece 3 located in an aperture 4. The prism groups 5, 6 are located within the container 1 and comprise two rhomboidal prisms 7, 8 on one end of each of which are respectively cemented two right angled prisms 9, 11. The interfaces 12, 13 between each rhomboidal prism and its associated right angled prism are treated so as to be partially reflecting, for example by partially metallising the surfaces of the prisms. The prism groups 5, 6 are located so that their principal axes are normally parallel and are capable of rotation relatively to each other about a vertical axis 14, by any suitable mechanism. Two optically plane parallel glass plates 16, 17 are placed between the ends of the two prism groups as illustrated and are capable of being rotated about spindles 18, 19 respectively.

The path of a light beam from an object 15 viewed through the microscope is shown by the arrowed lines. The beam is partially reflected at the interface 13 and is divided into two component beams which pass respectively through two optical systems. One of these component beams passes through the rhomboidal prism 8, which is a primary component of one optical system and is reflected at the end of this prism and passes into the right angled prism 9, through the interface 12 and into the eye piece 3. The second component beam passes through the interface 13 and the right angled prism 11 into the rhomboidal prism 7, which is a primary component of the other optical system, is internally reflected therein and is reflected off the interface 12 into the eye piece 3. If the prisms 7, 8 forming primary components of the optical systems are located parallel to one another, the two images of the object formed by the two component beams will coincide, but if the primary components are rotated relative to one another about the axis 14, the images will move apart. The images will move in a direction which, for small relative rotation of the prism groups, is normal to the plane of FIG. 1.

Rotation of one or both of the two glass plates 16, 17 which form secondary components of the optical systems on their respective spindles about an axis which is perpendicular to the paths of the two component beams will also displace the two images relative to each other by an amount dependent upon the angle through which each glass block is rotated and the thickness and refractive index of each glass block.

In order to check whether the widths of a plurality of particles lie within certain limits one of these particles is placed in the position of the object 15 and the two images of the particle formed by the apparatus are moved relative to each other by relative rotation of the prism groups 5, 6, through a predetermined amount from a reference position in which the images of the particle coincide. This movement moves images of diametrically opposite points on said particles towards each other. Fine adjustment of the position of the images is then brought about by rotation of one or both of the glass plates 16, 17. If the glass plates 16, 17 are rotated simultaneously and relatively between two fixed angular positions and the corresponding images of the diametrically opposite points on the particle coincide at some instant during the rotation of the glass plates it will be seen that the width of the particle lies between fixed limits. Therefore with such an apparatus the widths of a plurality of particles of a similar size can be checked.

The glass plates 16, 17 can be rotated manually between stops such as those illustrated in the arrangement in FIGURE 2. In this arrangement an arm 21 is attached to the spindle 19 and is free to move between a fixed stop 22 on the casing 1 and a moveable stop 23, the position of which is controlled by a micrometer 24. By altering the setting of the micrometer 24 the angular rotation of the plate 17 can be accurately controlled.

The rotation of the spindle 19 may be controlled by the electrical system illustrated. This system comprises two electromagnets 25, 26, associated respectively with yokes 27, 28. When either of these magnets is energised it attracts the arm 21 and therefore the arm 21 moves against either of the stops 22, 23. By energising each magnet 25, 26, alternately the arm 21 can be caused to oscillate.

By repeatedly oscillating the arm 21 between fixed stops the diameter of a plurality of particles can be readily checked. Preferably the oscillation of the arm is such that the plate 17 spends most of its time in its two extreme positions and takes only a short time for the passage between these two positions. It will be appreciated that plate 16 is controlled by a similar arrangement if it is required to move.

An electrical circuit for providing the correct form of oscillation in the arm 21 is illustrated in FIG. 2. The circuit comprises two fixed resistances R1, R2, two variable resistances R3, R4, two capacitances C1, C2 and two transistors T1, T2 connected as illustrated between two supply lines L1, L2. Typical value of the components are as follows, R1, R2—4.7 kilohms, R3, R4—50 kilohms, and C1, C2—25 microfarads. With coils of resistance 1700 ohms for each electromagnet 25, 26 and a potential of 24 volts between the lines L1, L2, and the component values above, the frequency of oscillation of the plate 17 can be between 5 cycles and a half a cycle per second.

When the plate 17 is not required to oscillate the arm 21 may be biased against the moveable stop 23 by a suitable spring.

There is provided by the apparatus described above means for checking the small distances between corresponding pairs of points on a plurality of particles or for checking the diameters or the widths of the particles.

We claim:

1. In a microscope optical apparatus for indicating small distances on an object comprising means for splitting an image carrying beam along two paths, a means for recombining the beams in the two paths so that both beam images are visible in a single eyepiece of the apparatus, and a first beam deflecting means in at least one of said paths arranged for adjusting the relative positioning of the two images visible in the single eyepiece, the improvement comprising; a second beam deflecting means in at least one of said two paths for further varying the relative positioning of the two images visible in the single eyepiece, said second beam deflecting means including a deflecting member oscillatable between two end positions corresponding to the limits of a predetermined measured distance on the object, means for oscillating the deflecting member between said end positions, and a means for controlling the amplitude of the oscillations of the oscillatable member between said end positions.

2. A microscope optical apparatus as claimed in claim 1 wherein the means for splitting and the means for recombining the two images comprise relatively rotatable beam splitting and combining prisms for forming and joining the two beam paths, and the said deflecting member includes a transparent parallel plate pivotally mounted transversely to the beam in at least one of said two beam paths.

3. Optical apparatus for checking the distance between two points on an object comprising two optical systems, each optical system including components for forming an image of the same object together with a primary beam deflecting component and a secondary beam deflecting component controlling the position of the path of the beam of light from the object to the image, means for moving the primary deflecting members of said optical systems relative to each other predetermined amounts from reference positions in which said images coincide, the improvement comprising a means for oscillating the secondary deflecting member of at least one of said optical systems between two end positions corresponding to the limits of a measured distance on the object, and a means for controlling the amplitude of oscillation of the secondary deflecting member between said end positions.

4. A microscope optical apparatus as claimed in claim 3 including a magnetizable member attached to the said secondary beam deflecting component of one of said optical systems and free to pivot about a fixed axis, means for limiting the rotational movement of said magnetizable member, two electromagnets located respectively on opposite sides of said magnetizable member, and means for energizing said electromagnets alternately so as to oscillate said magnetizable member between its limits of movement and said secondary beam deflecting component between the said end positions and thereby to oscillate said images relative to each other between two selected positions.

5. A microscope optical apparatus as claimed in claim 3 wherein the means for oscillating includes a means for simultaneously oscillating the secondary deflecting component of each said system between the said end positions, and the said means for controlling includes a means for controlling the amplitude of oscillation of both secondary beam deflecting members.

6. A microscope optical apparatus as claimed in claim 5 including a magnetizable member attached to each of said secondary beam deflecting components, each magnetizable member being free to pivot about a fixed axis, and means for limiting the rotational movement of said magnetizable members, two electromagnets located respectively on opposite sides of each magnetizable member, and means for energizing the electromagnets associated with each magnetizable member alternately so as to oscillate each magnetizable member between its limits of movement and said secondary beam deflecting components between the said end positions and thereby to oscillate said images relative to each other between two selected positions.

7. A method for checking the distance between two points on an object comprising the steps of; splitting an image carrying beam from the object into two paths, recombining the beams at a later point in said paths so that the images become substantially coincident, deflecting one of said beams to separate the substantially coincident images by a fixed predetermined amount, which amount is dependent upon the distance between said points on the object, and subsequently oscillating at least one of said separated images so that it moves through a cycle of a preselected amplitude relative to the other image to provide coincidence of said points at some time during said oscillating, and utilizing said coincidence of said points to check the distance between said two points.

No references cited.

JEWELL H. PEDERSEN, *Primary Examiner.*

R. L. WIBEFT, *Assistant Examiner.*